United States Patent [19]

Kanbara et al.

[11] Patent Number: 5,288,535
[45] Date of Patent: Feb. 22, 1994

[54] ELECTRODE FOR ELECTROVISCOUS FLUID

[75] Inventors: Makoto Kanbara; Masahiko Hayafune; Hirotaka Tomizawa; Katsuya Arai, all of Ooi, Japan

[73] Assignee: Tonen Corporation, Tokyo, Japan

[21] Appl. No.: 982,113

[22] Filed: Nov. 25, 1992

Related U.S. Application Data

[63] Continuation of Ser. No. 515,969, Apr. 27, 1990, abandoned.

[30] Foreign Application Priority Data

Apr. 28, 1989 [JP] Japan .................. 1-110497

[51] Int. Cl.$^5$ .................................................. B32B 9/00
[52] U.S. Cl. .......................................... 428/68; 428/457; 428/688; 428/901; 428/461
[58] Field of Search ................. 428/457, 461, 488, 901

[56] References Cited

U.S. PATENT DOCUMENTS

| | | | |
|---|---|---|---|
| 3,150,678 | 9/1964 | Nuber | 316/262 |
| 4,133,935 | 1/1979 | Dawson | 428/379 |
| 4,532,186 | 7/1985 | Shibagaki et al. | 428/457 |
| 4,782,927 | 11/1988 | Sproston et al. | 192/21.5 |
| 4,783,358 | 11/1988 | Ikeda et al. | 428/138 |
| 4,783,368 | 11/1988 | Yamamoto et al. | 428/336 |
| 4,858,733 | 8/1989 | Noguchi et al. | 188/267 |
| 4,959,130 | 9/1990 | Josowicz et al. | 204/32.1 |
| 5,028,481 | 7/1991 | Stramel | 428/461 |
| 5,057,378 | 10/1991 | Nishino et al. | 428/209 |

FOREIGN PATENT DOCUMENTS 2230989 10/1987 Japan .
399093 3/1966 Switzerland .

OTHER PUBLICATIONS

"Structure and Properties of Quasi-Amorphous Films Prepared by Ion Beam Techniques", *Thin Solid Films*, 72 (1980), Weissmantel et al, pp. 19–31.

Primary Examiner—Patrick J. Ryan
Assistant Examiner—Cathy Lee
Attorney, Agent, or Firm—Nikaido, Marmelstein, Murray & Oram

[57] ABSTRACT

An electrode for applying voltage to electroviscous fluid, particularly where the electroviscous fluid has electrically insulating fluid and porous solid particles, the ER effect can be stably maintained up to a high temperature range and high durability can be obtained by laminating an insulating layer on the surface of the electrode in contact with the electroviscous fluid.

10 Claims, 2 Drawing Sheets

ELECTRODE FOR ELECTROVISCOUS FLUID

This application is a continuation of application Ser. No. 515,969, filed Apr. 27, 1990, now abandoned.

BACKGROUND OF THE INVENTION

The present invention relates to an electrode for applying voltage to electroviscous fluid, in which viscosity can be controlled by voltage application, and in particular to an electrode for applying voltage to electroviscous fluid, which can be utilized for electric control of mechanical devices such as clutches, valves, shock absorbers, etc..

Electro-rheological fluid or electroviscous fluid, in which viscosity of the fluid is changeable by the application of voltage, has been known for many years (Duff, A. W., Physical Review, Vol. 4, No. 1 (1896) 23). Early studies on electroviscous fluid concentrated on the system containing liquid only, and the electroviscous effect was limited. Later studies were made on the electroviscous fluid of solid disperse system, where considerable electroviscous effect could be obtained.

For example, Winslow proposed an electroviscous fluid, using paraffin, silica gel powder and adding water to make the system slightly electroconductive (Winslow, W. M., J. of Applied Physics, Vol. 20 (1949) 1137). From this study by Winslow, the electroviscous (electro-rheological) effect of the electroviscous fluid is called ER effect or Winslow effect.

The mechanism of thickening effect (ER effect), in the electroviscous fluid has also been studied. For example, Klass reported that each particle in electroviscous fluid, also called the dispersoid generates the induced polarization of the electric double layer, in electrical fields and this was the primary cause of the thickening effect (Klass, D. L., et al., J. of Applied Physics, Vol. 38, No. 1 (1967) 67). If this is explained from the principle of the electric double layer, the ions adsorbed on the dispersoids (such as silica gel) are evenly arranged on outer surface of dispersoid when E (electric field)=0, while ion distribution was deviated when E (electric field)=finite value, and particles exert electrostatic action on each other in an electric field.

Thus, each particle forms a bridge between electrodes and begins to have shearing resistance to stress, resulting in the thickening or ER effect.

However, a metal electrode such as copper is used as the electrode to apply voltage to the electroviscous fluid of conventional type, whereas, when voltage is applied on an electroviscous fluid, constant current flows and an electrochemical reaction on the electrode inevitably occurs by the formation of a bridge along with the dipole formation of dispersoid particles. Therefore, the conventional type electroviscous fluid system inherently has the following problems:

(1) By the consumption of the water, polyhydric alcohol, another substance used as the polarization promoting agent which results from the electrochemical process, electroviscous fluid is electrochemically deteriorated, and the thickening effect is decreased.

(2) By electrochemical reaction, metal electrodes are eluted and corroded, which reduces the durability of the electroviscous fluid system. This imposes serious limitations on the metal electrode such as copper electrode for the electroviscous fluid system.

It is an object of this invention to offer an electrode for electroviscous fluid,, by which it is possible to maintain stable a ER effect up to a high temperature range and to obtain higher durability.

SUMMARY OF THE INVENTION

The electrode for electroviscous fluid according to the present invention is an electrode to apply voltage to the electroviscous fluid, having electrically insulating fluid and porous solid particles as principal components, characterized in that an insulating layer is laminated on the contact surface with the electroviscous fluid.

When voltage is applied on electroviscous fluid, solid particles such as silica gel are polarized in the electrically insulating fluid, which constitutes the electroviscous fluid, and a bridge is formed by solid particles between the electrodes. By the formation of a bridge, a thickening effect which is proportional to the applied voltage is generated in the electroviscous fluid, and the fluid begins to have shearing resistance to stress. In such electroviscous fluid, the electrically conductive polarization promotion agent is added to promote the polarization of solid particles. However, undesirable electrochemical reaction occurs which adversely affects the service life of the electroviscous fluid, electrodes, etc. Conventionally, it was considered that the bonding was strengthened when constant current was flowing, through the bridge of solid particles in the electroviscous fluid and that this electrochemical reaction was unavoidable for ER devices.

The inventors have found that the flow of electric current is not necessarily required for the polarization of solid particles and for the formation of the bridge and that an ER effect can be given by electroviscous fluid when the electrode is laminated with an insulating layer. However, if the insulating layer is too thick, the voltage on electroviscous fluid cannot be increased because the Coulomb force between particles themselves or between particle and electrode is weakened and voltage loss in the insulating layer is high. Thus, it is desirable to have a film thickness of 50 $\mu$m or less.

By laminating the insulating layer on the electrode, the electrode for electroviscous fluid according to this invention has high durability within the wide temperature range up to high temperature. By the use of such electrode, it is possible to provide an electroviscous fluid system with high durability. Viscosity remained virtually constant for a measured period; of about 50 hours.

Therefore, the electrode for electroviscous fluid according to the present invention is useful for the application on control equipment utilizing the viscosity change, and an ER device with extremely high durability can be provided.

DESCRIPTION OF THE PREFERRED EMBODIMENT

Figure 1:
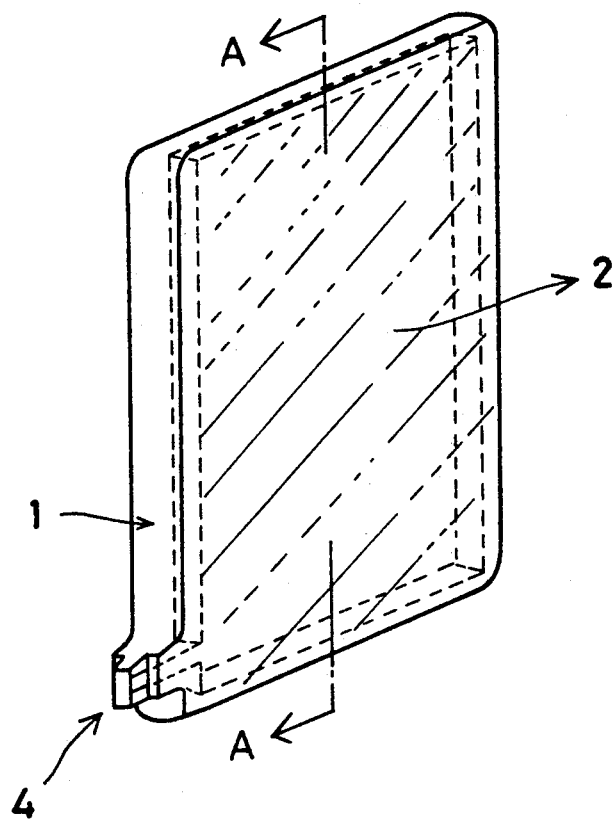
FIG. 1 is a schematical illustration of an embodiment of an electrode for electroviscous fluid according to the present invention.
Figure 2:
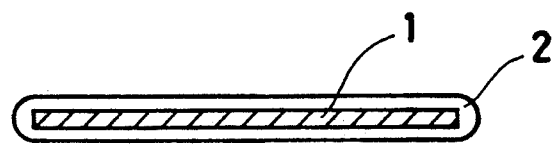
FIG. 2 is a cross-sectional view of electrode for electroviscous fluid shown in FIG. 1.

FIG. 1 is a schematic illustration of an embodiment of an electrode for electroviscous fluid according to this invention, and FIG. 2 is a cross-sectional view along the line A—A. In the figures, 1 denotes an electrode, 2 an insulating layer, and 4 a lead unit.

As the material to form the electrode, a metal such as copper, aluminum, gold, platinum, silver, iron, zinc, palladium, osmium, iridium, nickel, lead, tantalum, etc. can be used.

The electrode 1 must have a certain degree of ridigity in order to perform its function as an electrode for ER device. A metal plate of sufficient thickness is used.

The insulating layer to cover this electrode may either an inorganic insulating layer or an organic insulating layer.

As the material to form an inorganic insulating layer, the oxides such as zirconium oxide/yttrium oxide, berylium oxide, magnesium oxide, calcium oxide, silicon dioxide, silane coupling agent, alumina, titania, thorium oxide, etc., the carbides such as silicon carbide, titanium carbide, tungsten carbide, boron carbide ($B_4C$), zirconium carbide, vanadium carbide, tantalum carbide, etc., the nitrides such as silicon nitride, as well as diamond, i-C (a-Diamond), etc. may be used.

The inorganic insulating layer can be laminated by various methods such as CVD (chemical vapor deposition) method, plasma CVD method, ion beam CVD method, slurry coating method, spin cast method, LPD (liquid phase deposition) method, PVD (physical vapor deposition), sputter method, etc..

An organic insulating layer must have oil-resistant property to electroviscous fluid and heat-resistant property for the operation at the temperature as high as 150° C. As the material to form such an organic insulating layer, thermoplastic engineering plastics such as polyamide, polyacetal, polybutylene terephthalate, polyethylene terephthalate, reinforced polyethylene terephthalate, etc., the non-crosslinked thermoplastic engineering plastics such as polyether-sulfon, polyphenylene sulfide, polyallylate, polyamideimide, polyetheretherketone, etc., the non-crosslinked compression molding engineering plastics such as polyimide, polyallylate, fluoro-resin, etc., the crosslinked engineering plastics such as polyamide-bismaleimide, polytriazine, crosslinked polyamideimide, polyvinylphenol/epoxy, Friedel-Craft resin/epoxy, heat-resistant epoxy, etc. or a blended compound of these plastics (such as polymeralloy or copolymer), or a material reinforced by glass fiber or inorganic whiskers (such as carbon fiber) may be used.

These organic insulating layers can be formed by CVD method, PVD method, vacuum evaporation method, spray coating method, spin cast method, electrostatic coating method, dipping method, brush coating method, etc. Also, the layer may be attached using plastic film as adhesive.

Alternatively, so-called enamel coating by coating drying oil and by baking, or insulating film such as formal coating film produced by coating polyvinyl formal and baking may be used.

In the case where the electrode is of a plate type, and alumina or alumina silica is used as insulating material, CVD method, plasma CVD method, or PVD method may be used to form the insulating layer. In case of silicon nitride (pre-ceramic polymer (PCP)), the spin cast method, spray coating method, brush coating method, immersion method, etc. may be used to form the insulating layer. In case the engineering plastics such as polyimide, polyamideimide, PPA (polyparabanic acid), varnish, etc. are used, spin cast method, spray coating method, CVD method, or PVD method may be employed. In case heat-resistant, weather-resistant and electrically insulating paints such as fluoro-resin paint, epoxy-phenol resin paint, etc. are used, spin cast method, spray coating method or electrostatic coating method may be used to form the insulating layer.

In case the electrode is a complicated shape, such as having curved surfaces, the engineering plastics such as polyimide, PPA, varnish, etc. may be laminated by spray coating method, dipping method, etc. or fluoro-resin paint, epoxy-phenol resin paint, etc. may be laminated by a spray coating method, dipping method, etc.

For both an inorganic insulating layer and an organic insulating layer, the thickness of the film to be laminated on the electrode may be 0.01–50 $\mu$m, or more preferably, 0.1–20 $\mu$m.

When film thickness is thin, pin holes or cracks may occur when the film is formed, and the insulating effect is thereby reduced. Therefore, film thickness must be at least 0.01 $\mu$m or more. If it is too thick, however, electrostatic action of the particles and the electrodes is suppressed, and voltage loss on the insulating layer is increased. Thus, voltage is not effectively distributed to the electroviscous fluid. A thickness, therefore, of more than 50 $\mu$m is not desirable.

Figure 3:
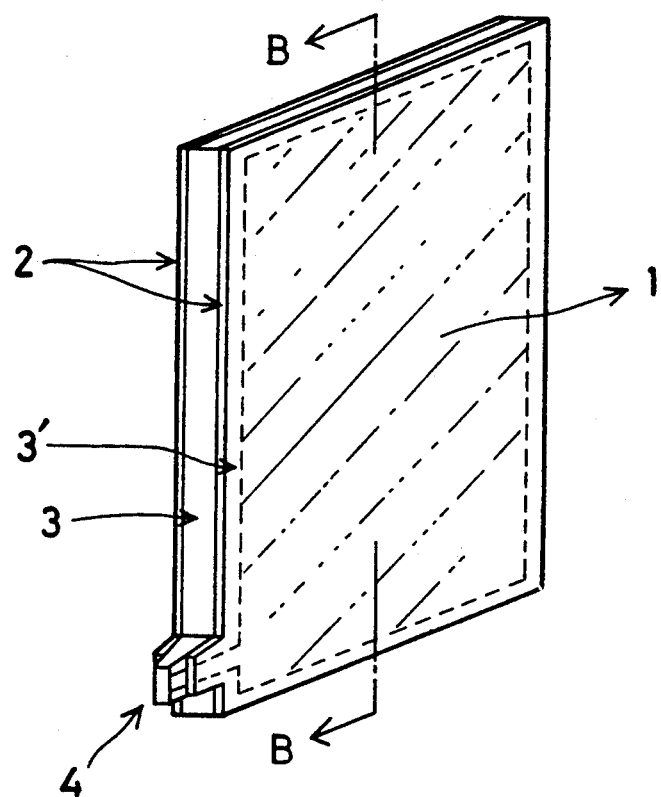
FIG. 3 is a schematic illustration of another embodiment of an electrode for electroviscous fluid of this invention.
Figure 4:
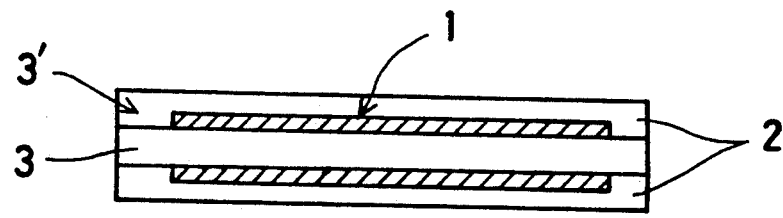
FIG. 4 is a cross-sectional view of the electrode for electroviscous fluid shown in FIG. 3.

FIG. 3 is a schematic illustration of another embodiment of the electrode for electroviscous fluid of this invention, and FIG. 4 is a cross-sectional view of the embodiment along the line B—B. In these figures, 1 denotes an electrode, 2 an insulating layer, 3 a substrate, 3' a substrate end, and 4 a lead unit.

To form an electrode for electroviscous fluid as shown in FIG. 3, a substrate 3 of plastic plate or ceramic plate is used as an electrode support member. On one side or on both sides of this substrate, metal thin film (with thickness of 1.0–20 $\mu$m) is attached to form instead of metal thin film, metal material may be laminated on the substrate by vacuum evaporation method or electroless plating.

In these cases, a lead unit 4 may be furnished to connect with external circuit, and the electrode 1 may be formed by vacuum-depositing or affixing the above-mentioned metal thin film on the substrate except the substrate end 3'. Then, the insulating layer 3 to cover this electrode 1 is formed by the same procedure as the laminating procedure for the insulating layer of the electrode for electroviscous fluid as given in FIG. 1. Thus, the electrode for electroviscous fluid according to this invention is obtained.

The shape of the electrode for electroviscous fluid is complicated in some cases, such as a plate type or a curved surface type. In case of the electrode of complicated shape, the insulating layer 2 may be formed by vacuum evaporation method.

There is no restriction on the type electrically insulating fluid for electroviscous fluid. For example, there are mineral oils and synthetic lubricant oils. More concretely, paraffin type mineral oil, naphthene type mineral oil, poly-$\alpha$-olefin, polyalkyleneglycol, silicone, diester, polyol-ester, phosphoric acid ester, silicon compound, fluorine compound, polyphenylether, etc. may be used. The electrically insulating fluid with a viscosity range of 5–300 cSt at 40° C. may be used.

Porous solid particles as practically used may be used as dispersoid. For example, silica gel, moisture-containing resin, diatomaceous earth, alumina, silica-alumina, zeolite, ion exchange resin, cellulose, etc. may be used. In these porous solid particles, those with particle size of 10 nm–200 $\mu$m are normally used at the ratio of 0.1–50 wt %. It is desirable to use the particles at the ratio of less than 0.1 wt %, because the ER effect is lowered. If it exceeds 50 wt %, dispersion property is reduced, and this is also not desirable.

Dispersing agent may be used to disperse porous solid particles uniformly and stably in the electrically insulating fluid. The dispersing agent as practically used are normally adopted. For example, sulfonates, phenates, phosphonates, succinic acid imide, amines, non-ionic dispersing agents, etc. are used. More concretely, magnesium sulfonate, calcium sulfonate, calcium phosphonate, polybutenyl succinic acid imide, sorbitan monooleate, sorbitan sesqui-oleate, etc. are used. Normally, these substances are used by 0.1–10 wt %, while these may not be used if the porous solid particles have high dispersing property. Also, a polyhydric alcohol component, acid and salt or basic components may be added. In these instances, it is preferable to use alcohol-resistant or acid-resistant material as the insulating layer. Polyhydric alcohol, acid, salt or basic components may be added alone to improve the ER effect. A polyhydric alcohol component can improve the ER effect at high temperature range, while acid components can increase polarization effect. Also, these two components can be used simultaneously, and cumulative effects can be achieved with the ER effect in high temperature range and the increased polarization effect.

As polyhydric alcohol, dihydric alcohol and trihydric alcohol are effective, and ethyleneglycol, glycerin, propanediol, butanediol, hexanediol, etc. may also be used.

As acid components, inorganic acids such as sulfuric acid, hydrochloric acid, nitric acid, perchloric acid, chromic acid, phosphoric acid, boric acid, or organic acids such as acetic acid, formic acid, propionic acid, lactic acid, isolactic acid, valeric acid, oxalic acid, malonic acid, etc. are used.

As the salt, any compound consisting of a metallic or basic radical (such as $NH_4^+$, $N_2H_5^+$) and an acid radical may be used. Above all, it is preferable to use the compound, which is dissolved in polyhydric alcohol and water and is dissociated, for example, halogenated compound of alkali metal and alkali earth metal, which forms typical ionic crystal, or alkali metal salt of organic acid. As such types of salt, there are LiCl, NaCl, KCl, $MgCl_2$, $CaCl_2$, $BaCl_2$, LiBr, NaBr, KBr, $MgBr_2$, LiI, NaI, KI, $AgNO_3$, $Ca(NO_3)_2$, $NaNO_2$, $NH_4NO_3$, $K_2SO_4$, $Na_2SO_4$, $NaHSO_4$, $(NH_4)_2SO_4$ or salt of alkali metal such as formic acid, acetic acid, oxalic acid, succinic acid, etc.

The base used in the present invention includes hydroxide of akali metal or alkali earth metal, carbonate of alkali metal, amines, etc. It is preferable that the base is dissolved in polyhydric alcohol or in polyhydric alcohol and water and is dissociated. As the bases of this type, there are NaOH, KOH, $CA(OH)_2$, $Na_2CO_3$, $NaHCO_3$, $K_3PO_4$, $Na_3PO_4$, aniline, alkylamine, ethanolamine, etc. The salts and bases as described above can be simultaneously used in this invention.

It is preferable to use acids, salts and bases by 0.01–5 wt % to electroviscous fluid. If it is less than 0.01 wt %, ER effect is low. If it exceeds 5 wt %, electric current flows more easily, and power consumption is increased more.

Antioxidant may be added. The purpose of antioxidant is to prevent oxidation of electrically insulating liquid and to stop oxidation of polyhydric alcohol, which is a polarizing agent.

It is preferable to use the antioxidant inactive to the polarizing agent and porous solid particles. Phenol type or amine type antioxidants as practically adopted can be used. More concretely, phenol type antioxidants such as 2,6-di-t-butylparacresol, 4,4'-methylene-bis (2,6-di-t-butylphenol), 2,6-di-t-butylphenol, etc. or amine type antioxidants such as dioctyldiphenylamine, phenyl-$\alpha$-naphthylamine, alkylphenyl-amine, N-nitrosodiphenylamine, etc. can be used.

It is naturally possible to use water in such degree as not to reduce the ER effect in the electroviscous fluid system of this invention.

In the following, the features of the invention will be described in connection with the embodiments. The present invention is not, however, limited to these embodiments.

Example 1

As shown in FIG. 1 and FIG. 2, drying oil was coated on a copper electrode 1, having a lead unit 4, by the spray coating method. After baking at 150° C., the insulating layer 2 of enamel quality was formed having a thickness of 5 $\mu$m.

Example 2

By the same procedure as in Embodiment 1, polytetrafluoroethylene was dissolved in the mixed solution of 1,1,1-trichloroethane, 1,1,2-trichloro-1,2,2-trichloroethane and tetrabutyl titanate, and this solution was coated on a copper electrode by a spray coating method. After melting at 350° C., an insulating layer with thickness of 20 $\mu$m was formed.

Example 3

By the same procedure as in Embodiment 1, xylene solution containing silicon nitride (polysilazane with average molecular weight of 1500–1700) by 20 wt % was coated on a SUS electrode by the immersion method. After baking at 600° C., an insulating layer with thickness of 1.0 $\mu$m was formed.

Example 4

On an aluminum substrate, polyethylene-terephthalate film of 5 $\mu$m thick was attached using epoxy adhesive, and an insulating layer of 10 $\mu$m thick in the same shape as Embodiment 1 was obtained.

Example 5

As shown in FIG. 3 and FIG. 4, a copper thin film (thickness: 15 $\mu$m) was attached on both sides of polyethylene-terephthalate substrate (film thickness: 0.5 mm) 3 having a lead unit 4 using adhesive in such manner that the copper film has smaller area than substrate area and power is connected at the tip of the lead unit 4. Then, polyethylene-terephthalate film (film thickness: 6 $\mu$m) was attached on it by adhesive to cover the electrode 1. Thus, the electrode for the electroviscous fluid of this invention was prepared.

Example 6

By the same procedure as in Embodiment 5, an electrode was formed on the substrate. On the electrodes on both sides, drying oil was applied by the spray coating method to cover the electrodes. After baking at 150° C., an insulating layer of enamel quality with thickness of 5 μm was obtained.

Example 7

By the same procedure as in Embodiment 5, Ni thin film was formed by electro-less plating method on both sides of alumina substrate (thickness: 0.7 mm), and alumina was applied on it by plasma CVD method in film thickness of 3 μm.

Next, an example of the composition of the electroviscous fluid, to which the electrode by this invention is to be applied, is given:

| | |
|---|---|
| Mineral oil | 89 wt % |
| Silica gel | 6 wt % |
| Ethyleneglycol | 0.5 wt % |
| Acetic acid | 0.5 wt % |
| Succinic acid imide | 4 wt % |

The viscosity of mineral oil was adjusted in such a manner that all samples have 80 cSt at 40° C. (Operating conditions and evaluation items for electroviscous fluid)

With the electroviscous fluid at 40° C. and 90° C., the following parameters were measured and evaluated using a voltage-applicable rotation viscosimeter:

Responsiveness

Evaluated by the time, (second) until viscosity is stabilized when an AC electric field is changed from 0 to $2.0 \times 10^6$ (V/m).

Reproducibility

Evaluated by the ratio of viscosity fluctuation at the electric field of $2.0 \times 10^6$ (V/m) when AC electric field is changed repeatedly by the cycle of $0 \rightarrow 2.0 \times 10^6$ (V/m) $\rightarrow 0$.

Durability

Evaluated by the variation (%) of viscosity over time when the AC electric field is stabilized at $2.0 \times 10^6$ (V/m). (Measuring time: 50 hours)

Thickening effect

Evaluated by the multiplying factor, of viscosity when the AC electric field is set to $2.0 \times 10^6$ (V/m) compared with the electric field at 0.

The results of the evaluation are summarized in the following table. No change after measurement was observed on the electrodes.

The case where a copper electrode without laminating the insulating layer is given as a comparative example in the following table.

| | | Responsiveness (sec.) | Reproducibility (%) | Durability (%) | Electroviscous effect (ratio) |
|---|---|---|---|---|---|
| Embodiment 1 | 40° C. | 1 or less | ±2 | 100 | 5 |
| | 90° C. | 1 or less | ±2 | 96 | 7 |
| Embodiment 2 | 40° C. | 1 or less | ±2 | 100 | 4 |
| | 90° C. | 1 or less | ±2 | 98 | 6 |
| Embodiment 3 | 40° C. | 1 or less | ±2 | 100 | 5 |
| | 90° C. | 1 or less | ±2 | 98 | 7 |
| Embodiment 4 | 40° C. | 1 or less | ±2 | 100 | 5 |
| | 90° C. | 1 or less | ±2 | 98 | 7 |
| Embodiment 5 | 40° C. | 1 or less | ±2 | 100 | 4 |
| | 90° C. | 1 or less | ±2 | 98 | 6 |
| Embodiment 6 | 40° C. | 1 or less | ±2 | 100 | 5 |
| | 90° C. | 1 or less | ±2 | 98 | 7 |
| Embodiment 7 | 40° C. | 1 or less | ±2 | 100 | 5 |
| | 90° C. | 1 or less | ±2 | 97 | 8 |
| Embodiment 8 | 40° C. | 1 or less | ±2 | 100 | 5 |
| | 90° C. | 1 or less | ±2 | 98 | 7 |
| Comparative example | 40° C. | 1 or less | ±2 | 20 | 1.8 |
| | 90° C. | 1 or less | ±2 | 10 | 1.6 |

What we claim is:

1. An electrode for electroviscous fluid for applying voltage on electroviscous fluid, wherein an insulating layer is laminated on the entire electrode surface, which is in contact with the electroviscous fluid.

2. An electrode for electroviscous fluid as set forth in claim 1, wherein said electrode is a plate electrode.

3. An electrode for applying voltage on electroviscous fluid, wherein the electrode comprises a substrate, and electrode film and an insulating layer, said electrode film is laminated on said substrate except an end thereof, and the insulating layer has a thickness of 0.01–50 μm is laminated on the entire electrode film surface, which is in contact with said electroviscous fluid.

4. An electrode for electroviscous fluid as set forth in claims 1, 2 or 3, wherein the electroviscous fluid includes an electrically insulating fluid and porous solid particles as principal components.

5. An electrode for electroviscous fluid as set forth in claim 1, 2 or 3, wherein said insulating layer has thickness of 0.01 μm to 50 μm.

6. An electrode for electroviscous fluid as set forth in claim 3, wherein said substrate is formed of a plastic material.

7. An electrode for electroviscous fluid as set forth in claim 3, wherein said substrate is formed of a ceramic material.

8. An electrode for applying voltage as set forth in claim 3, wherein said insulating layer comprises at least one of the group consisting of zirconium oxide, yttrium oxide, beryllium oxide, magnesium oxide, calcium oxide, silicon dioxide, silane coupling agent, alumina, titania, thorium oxide, silicon carbide, titanium carbide, tungsten carbide, boron carbide ($B_4C$), zirconium carbide, vanadium carbide, tantalum carbide, silicon nitride, diamond, i-carbon, polyamide, polyacetal, polybutyrene terephthalate, polyethylene terephthalate, reinforced polyethylene terephthalate, polyether sulfone, polyphenylene sulfide, polyallylate, polyamideimide, polyether-etherketone, polyimide, fluoro-resin, polyamino-bismuthimide, polytriazine, cross-linked polyamideimide, polyvinylphenol/epoxy, Friedel-Crafts resin/epoxy, heat-resistant epoxy, or blended compound of these plastics; glass fiber, carbon fiber, enamel paint and polyvinyl formal resin.

9. An electrode for electroviscous fluid as set forth in claim 4, wherein said electrically insulating fluid comprises at least one of the group consisting of paraffine type mineral oil, naphthene type mineral oil, poly-α-olefin, polyalkyleneglycol, silicone, diester, polyol ester, phosphoric acid ester, silicon compound, fluorine compound, polyphenylether, and synthesized hydrocarbon.

10. An electrode for electroviscous fluid as set forth in claim 4, wherein said porous solid particles comprise at least one of the group consisting of silica gel, moisture-containing resin, diatomaceous earth, alumina, silica-alumina, zeolite, ion exchange resin, and cellulose.

* * * * *